US012676247B2

(12) United States Patent
Chang et al.

(10) Patent No.: US 12,676,247 B2
(45) Date of Patent: Jul. 7, 2026

(54) METHOD FOR MEASURING DROP TIME OF A CONTROL ROD CLUSTER INTEGRATED WITH A ROD POSITION MEASUREMENT DEVICE

(71) Applicant: NUCLEAR POWER OPERATIONS RESEARCH INSTITUTE (NPRI), Shanghai (CN)

(72) Inventors: Zhengke Chang, Jiaxing (CN); Minghui Zhang, Jiaxing (CN); Yuan Huang, Jiaxing (CN); Ye Tian, Jiaxing (CN); Shaohua Xu, Jiaxing (CN); Xinxin Liu, Jiaxing (CN); Weijian Zhu, Jiaxing (CN); Yiming Ma, Jiaxing (CN); Shengfeng Xu, Jiaxing (CN); Bo Chao, Jiaxing (CN); Ning Tao, Haikou (CN); Zihua Yang, Jiaxing (CN); Desong Lang, Mudanjiang (CN); Qichao Wang, Jiaxing (CN)

(73) Assignee: Nuclear Power Operations Research Institute (NPRI), Shanghai (CN)

( * ) Notice: Subject to any disclaimer, the term of this patent is extended or adjusted under 35 U.S.C. 154(b) by 439 days.

(21) Appl. No.: 18/255,887

(22) PCT Filed: Jan. 14, 2021

(86) PCT No.: PCT/CN2021/071640

§ 371 (c)(1),
(2) Date: Jun. 5, 2023

(87) PCT Pub. No.: WO2022/116367

PCT Pub. Date: Jun. 9, 2022

(65) Prior Publication Data

US 2024/0105351 A1 Mar. 28, 2024

(30) Foreign Application Priority Data

Dec. 5, 2020 (CN) ......................... 202011417550.5

(51) Int. Cl.
*G21C 17/12* (2006.01)
*G21C 7/10* (2006.01)

(52) U.S. Cl.
CPC ............... *G21C 17/12* (2013.01); *G21C 7/10* (2013.01)

(58) Field of Classification Search
CPC ............. G21C 17/12; G21C 7/10; G21C 7/08
(Continued)

(56) References Cited

U.S. PATENT DOCUMENTS 5,006,301 A * 4/1991 Lexa ...................... G21C 17/00 376/258
5,408,508 A * 4/1995 Federico .................. G21C 7/08 376/258

(Continued)

FOREIGN PATENT DOCUMENTS

CN 102280150 A 12/2011
CN 102955041 A 3/2013

(Continued)

OTHER PUBLICATIONS

First Office Action for Chinese Patent Application No. 202011417550.5 dated Oct. 27, 2022 (10 pages including English Translation.

(Continued)

*Primary Examiner* — Jack W Keith
*Assistant Examiner* — Daniel Wasil
(74) *Attorney, Agent, or Firm* — Merchant & Gould P.C.

(57) ABSTRACT

A method for measuring drop time of a control rod cluster integrated with a rod position measurement device is provided, wherein the method is used to measure the drop time of the control rod cluster, and includes following steps. A voltage Ua of coils in Group A is monitored to capture a rod cluster drop signal. A point (tmax, Vmax) with a maximum drop speed is searched. An end of a time period when the control rod cluster starts to drop is retroactively calculated from tmax. A start of the time period when the drop reference signal DROPref drops from a maximum value to (Continued)

33% thereof is retroactively searched from a minimum value point of a drop reference signal DROPref. A time point t6 when a drop speed of the control rod cluster is lower than 0 is determined from tmax forward.

12 Claims, 13 Drawing Sheets

(58) Field of Classification Search
USPC .......................................................... 376/258
See application file for complete search history.

(56) References Cited

U.S. PATENT DOCUMENTS

| | | | | |
|---|---|---|---|---|
| 5,841,824 | A | 11/1998 | Graham | |
| 6,192,096 | B1 | 2/2001 | Ichikawa | |
| 6,404,835 | B1 | 6/2002 | Morton et al. | |
| 2001/0031030 | A1 * | 10/2001 | Halluin | G21C 17/00 376/245 |
| 2009/0252272 | A1 * | 10/2009 | Hashemian | G21C 17/12 376/258 |
| 2013/0177123 | A1 | 7/2013 | Sexton | |
| 2020/0258643 | A1 | 8/2020 | Chang | |

FOREIGN PATENT DOCUMENTS

| | | | | |
|---|---|---|---|---|
| CN | 103854708 | A | 6/2014 | |
| CN | 104332195 | A | 2/2015 | |
| CN | 204575828 | U | 8/2015 | |
| CN | 107799194 | A | 3/2018 | |
| CN | 107833643 | A | 3/2018 | |
| CN | 109243644 | A | 1/2019 | |
| CN | 111696692 | A | 9/2020 | |
| JP | H0815480 | A | 1/1996 | |
| KR | 20110014399 | A * | 2/2011 | G21C 7/08 |

OTHER PUBLICATIONS

Guoyong, et al., "Study on Automatic Measure Method of Rod Drop Time and Its Implementation", Nuclear Power Engineering, (2016), 37(4): 5 pages including English abstract.

Zhong, et al., "Drop Performance Testing of Qinshan Phase II NPP Project", Nuclear Power Engineering, (2003), 24(S1):3 pages including English abstract.

European Search Report received for EP Application No. 21899411.9 on Sep. 17, 2024, 8 pgs.

International Search Report and Written Opinion received for PCT Serial No. PCT/CN2021/071640 on Sep. 1, 2021, 11 pgs.

* cited by examiner

METHOD FOR MEASURING DROP TIME OF A CONTROL ROD CLUSTER INTEGRATED WITH A ROD POSITION MEASUREMENT DEVICE

METHOD FOR MEASURING DROP TIME OF A CONTROL ROD CLUSTER INTEGRATED WITH A ROD POSITION MEASUREMENT DEVICE

CROSS-REFERENCE TO RELATED APPLICATIONS

This application is a National Stage Application of PCT/CN2021/071640, filed Jan. 14, 2021, which claims priority to Chinese Patent Application No. 202011417550.5, filed Dec. 5, 2020, both of which are incorporated herein.

TECHNICAL FIELD

The present disclosure generally relates to a technical field of rod drop time measurement for nuclear power plants, and more particularly, to a method for measuring drop time of a control rod cluster integrated with a rod position measurement device.

BACKGROUND

Rapid regulation of reactor power in pressurized water reactor nuclear power plants is mainly realized through controlling lifting and lowering of control rod clusters. The lifting and lowering of the rod clusters are driven by a set of electromagnetic drive mechanism, such as Control Rod Drive Mechanism (CRDM). As shown in FIG. 1, when a control rod pin-holding claw) into the drive shaft tooth groove. When the control rod is stationary, a holding coil is powered on, and a holding hook jaw (also known as a gripper jaw) swings into tooth grooves of a drive shaft.

Emergency shutdown of reactor is achieved by opening a shutdown circuit breaker, cutting off a CRDM power supply, and allowing control rod clusters to fall into a reactor core under action of gravity. Length of rod cluster drop time directly determines whether safety shutdown can be realized. The rod cluster drop time is required to be less than a safety analysis value (for example, the safety analysis value for Qinshan Phase II Nuclear Power Plant is 2.4 seconds). Therefore, the rod cluster drop time must be measured before start-up of the reactor each time.

The rod cluster drop time consists of six sections, as shown in FIG. 2.

T4 is a time period from a holding coil current falling to 33% of a rated value to a rod cluster starting to drop, and should be shorter than 150 ms;

T5 is a time period from the rod cluster starting to drop to entering a buffer section;

T6 is a time period from the rod cluster entering the buffer section to reaching bottom of the buffer section, where T4+T5±T6 should be shorter than 3 s in a hot state.

The control rod cluster drop time is affected by an entire driving line which is composed of a driving mechanism, a guide cylinder assembly, a fuel assembly and a control rod cluster assembly. During a drop process, the control rod cluster may brush against control rod guide tubes in the guide cylinder assembly and the fuel assembly, and a buffer is provided by a buffer section of the control rod guide tube in the fuel assembly and a buffer spring under the control rod cluster assembly. Length of the buffer section of the control rod guide tube in the fuel assembly in a typical power plant is 640 mm. When the control rod cluster drops to the bottom of the reactor, it enters the buffer section by length of about 550-560 mm, which is 34.5 steps. The buffer spring under the control rod cluster assembly has length of 22.45 mm, and maximum compression length during the dropping process is about 5 mm.

As the control rod cluster and its connected drive shaft are located in environment with high temperature and high pressure created by the nuclear reactor, measurement of their positions is generally realized by a rod position detector based on electromagnetic induction principle. Measurement of the three time periods T4, T5 and T6 is also realized by the rod position detector based on non-contact measurement.

A typical rod position detector mainly includes a primary coil, a measurement coil, an auxiliary coil, a coil frame, a sealing shell and an outer sleeve. Taking Qinshan Phase II Nuclear Power Plant as an example, the rod position detector has total length of 4006 mm, an inner diameter of 154 mm, and an outer diameter of 300 mm. The primary coil is shaped as a long solenoid with about 2000 turns and a wire diameter of 1.97 mm, which is wound along an entire stroke. Both the measurement coil and the auxiliary coil are secondary coils, each of which has 1700 turns, width of 2 cm, and a wire diameter of 0.23 mm, and is coaxial with the primary coil. The primary coil is used to generate an alternating magnetic field, the measuring coil is used to form a rod position code, and the auxiliary coil is used to regulate a current of the primary coil.

The drive shaft is made of a magnetic material, while the sealing shell, the coil frame, and the outer sleeve of the detector as well as other components in the detector have relatively low magnetic permeability. In such a condition, whether the drive shaft passes through the measurement coil greatly affects an induced voltage. Whether the top of the drive shaft is above or below the measurement coil can be determined by monitoring an induced voltage of the measurement coil at a particular position. As long as a sufficient number of measurement coils are arranged to monitor an induced voltage signal of each coil, positions of the drive shaft and the control rod cluster can be roughly determined.

To roughly determine the position of the control rod cluster, a sufficient number of measurement coils may be arranged. A number and spacing of the measurement coils are determined based on stroke length of the driving shaft and a desired resolution. To reduce a number of wiring between the detector and a signal processing channel and reduce a number of signal processing devices, the measurement coils need to be grouped.

Taking Qinshan Phase II Nuclear Power Plant as an example, length of each mechanical step of the drive shaft is 15.875 mm, and an entire stroke is 228 mechanical steps. A resolution of the detector is 8 mechanical steps (i.e., 127 mm). There are 31 measurement coils which are divided into five groups including A, B, C, D, and E. An entire measurement stroke is 256 mechanical steps. The measurement coils are grouped as follows.

First, if a measuring coil C1 is wound at ½ height of the detector's measurement stroke, by monitoring its induced voltage (referred to an effective value hereinafter) V1, it can be known whether the rod position is in a section [0, 128) or [128, 256).

Further, if coils C21 and C22 are respectively wound at ¼ and ¾ height of the detector's measurement stroke, by monitoring an induced voltage V21 of C21, it can be known whether the rod position is in a section [0, 64) or [64, 128), and by monitoring an induced voltage V22 of C22, it can be known whether the rod position is in a section [128, 192) or [192, 256).

In fact, these three coils divide the entire measurement stroke into four sections with equal length. By monitoring the induced voltages of these three coils, it is possible to know which section the rod position is in. Levels of the induced voltages and the corresponding rod position are listed in a following table.

| Induced voltage | | | Section of rod | Position of rod |
|---|---|---|---|---|
| V21 | V1 | V22 | position | cluster |
| Low | Low | Low | [0, 64) | 0 |
| High | Low | Low | [64, 128) | 1 |
| High | High | Low | [128, 192) | 2 |
| High | High | High | [192, 256) | 3 |

If C21 and C22 are reversely connected in series to form a group (referred to as C2), as V21 and V22 are always in a sane phase, an output voltage of C2 is V2=|V21−V22|. Levels of the induced voltages and the corresponding rod position are listed in a following table.

| Inductive voltage | | After shaping | | Section of rod | Position of rod |
|---|---|---|---|---|---|
| V1 | V2 | Low→0, High→1 | | position | cluster |
| Low | Low | 0 | 0 | [0, 64) | 0 |
| Low | High | 0 | 1 | [64, 128) | 1 |
| High | High | 1 | 1 | [128, 192) | 2 |
| High | Low | 1 | 0 | [192, 256) | 3 |

Similarly, if four coils C31, C32, C33 and C34 are respectively wound at ⅛, ⅜, ⅝ and ⅞ height of the detector's measurement stroke, and are connected in series in turn to form a group C3, the entire measurement stroke is divided into 8 sections with equal length. By monitoring the three voltages of V1, V2 and V3 (=|V31−V32+V33−V34|), it is possible to determine which section the rod position is in, and the measurement resolution reaches 32 steps.

Further, if eight coils C41, C42 . . . and C48 are respectively wound at 1/16, 3/16, 5/16, 7/16, 9/16, 11/16, 13/16 and 15/16 height of the detector's measurement stroke, and are connected in series in turn to form a group C4, the entire measurement stroke is divided into 16 sections with equal length. By monitoring the four voltages of V1, V2, V3 and V4 (=|V41−V42+V43 . . . −V48|), it can be determined which section the rod position is in, and the measurement resolution reaches 16 steps.

Further, if 16 coils C51, C52 . . . and C516 are respectively wound at 1/32, 3/32, 5/32. . . and 31/32 height of the detector's measurement stroke, and are connected in series in turn to form a group C5, the entire measurement stroke is divided into 32 sections with equal length. By monitoring the five voltages V1, V2, V3, V4, and V5 (=|V51−V52+V53 . . . −V516|), it can be determined which section the rod position is in, and the measurement resolution reaches 8 steps.

Generally, groups C1, C2, C3, C4, and C5 are called groups E, D, C, B, and A, respectively. If the coils are numbered from low to high according to their positions, the coils in each group are numbered as follows.

Coil in Group E (first group): 16

Coils in Group D (second group): 8 24

Coils in Group C (third group): 4 12 20 28

Coils in Group B (fourth group): 2 6 10 14 18 22 26 30

Coils in Group A (fifth group): 1 3 5 7 9 11 13 15 17 19 21 23 25 27 29 31

FIG. 3 illustrates a structure of the detector and numbers of the coils.

A typical rod cluster drop time T5 is about 1.5 seconds to 2 seconds. As a normal rod position measurement signal takes a long time to process, the rod cluster drop time cannot be calculated through the normal rod position measurement signal.

Instead, the rod cluster drop time is generally calculated by measuring an induced voltage of the primary coil of the rod position detector. Referring to FIG. 2, the rod cluster drop time is obtained based on the holding coil current and the induced voltage of the primary coil.

An existing method for measuring the rod cluster drop time includes leading an induced voltage signal of the primary coil from a rod position device room to a rod control device room, and then is connected to a dedicated recorder or a test cabinet at the same time with a current signal of the holding coil. Due to a large number of control rods in the entire unit (for example, there are 33 control rod clusters in Qinshan Phase II Nuclear Power Plant is 33, and there are 61 control rod clusters in a typical one-million-kilowatt nuclear power unit), a number of simultaneous processing channels is limited when the dedicated recorder or the test cabinet is utilized for measurement. Therefore, a group switching method is generally used for measurement. Specifically, after a test is completed for a subgroup of rods, a voltage signal transfer cable of the primary coil needs to be moved to another subgroup of rods, and a current signal transfer cable of the holding coil needs to be moved to another subgroup of rods, which requires a lot of switching of wiring during the test.

SUMMARY

Technical Problems

Technical Solutions

Embodiments of the present disclosure provide a method for measuring drop time of a control rod cluster integrated with a rod position measurement device.

The method for measuring the drop time of the control rod cluster integrated with the rod position measurement device provided in embodiments of the present disclosure may save signal switching during a test process, enhance automation level of measurement and analysis, and reduce critical path time of nuclear reactor start-up planning occupied by measurement of the drop time.

Further, the method for measuring the drop time of the control rod cluster integrated with the rod position measurement device provided in embodiments of the present disclosure may introduce the rod drop reference signal into the rod position measurement device. The rod position measurement device comprehensively analyzes the rod drop reference signal and a signal of a rod position detector to obtain the drop time.

Further, with the method for measuring the drop time of the control rod cluster integrated with the rod position measurement device provided in embodiments of the present disclosure, a drop time measurement and analysis module is integrated in a rod position measurement cabinet with a drop time measurement and analysis function.

In an embodiment of the present disclosure, a method for measuring drop time of a control rod cluster integrated with a rod position measurement device is provided, wherein the method is used to measure the drop time of each control rod cluster, and includes: S1, monitoring a voltage Ua of coils in Group A to capture a rod cluster drop signal; S2, searching a point (tmax, Vmax) with a maximum drop speed or with a local maximum drop speed; S3, retroactively calculating, from tmax, an end of a time period T4 when the control rod cluster starts to drop; S4, retroactively searching, from a minimum value point of a drop reference signal DROPref, a start of the time period T4 when the drop reference signal DROPref drops from a maximum value to 33% of the maximum value; S5, determining, from tmax forward, a time point t6 when a drop speed of the control rod cluster is lower than 0; S6, calculating an end of a time period T6 when the drop speed of the control rod cluster is 0; S7, searching an end of a time period T5 when the drop speed of the control rod cluster drops rapidly; S8, calculating a time point t7 when the drop speed returns to 0 after t6; S9, calculating a time point t8 when the drop speed returns to 0 after t7; S10, calculating a time point t9 when the drop speed returns to 0 after t8; and S11, obtaining an analysis result, and saving and outputting the analysis result in a form of file.

Optionally, S1 includes: S1.1, performing digital filtering on the voltage Ua of the coils in Group A to obtain a first filtered voltage; S1.2, transforming a waveform of the first filtered voltage into broken lines and removing outlier points on the broken lines; S1.3, calculating a first median sequence; S1.4, searching a first minimal value point P2 (tmin, Vmin) of the first median sequence; S1.5, searching backward, from the first minimal value point, a median point P1 with a value smaller than Vmin/2; S1.6, determining a point P0 where a line connecting the first minimal value point P2 and the median point P1 intersects with a 0-axis; and S1.7, if a slope of a line connecting P0 and P2, a time difference between P0 and P2, and an amplitude difference between P0 and P2 are within predetermined lined ranges respectively, determining that the control rod cluster starts to drop.

Optionally, S2 includes: S2.1, performing digital filtering on a voltage Up of a primary coil to obtain a second filtered voltage; S2.2, transforming a waveform of the second filtered voltage into broken lines and removing outlier points on the broken lines; S2.3, calculating a second median sequence; S2.4, searching among the second median sequence a point P1, wherein absolute values of the point P1 and preceding three points of the point P1 exceed 0.5; S2.5, if a value of P1 is negative, inverting the second median sequence; S2.6, searching backward, from P1, a point P0 with a value smaller to than or equal to 0, and searching forward, from P1, a point P2 with a value smaller than or equal to 0; and S2.7, calculating a maximal value among a section between P0 and P2 to obtain Pmax (tmax, Vmax).

Optionally, S3 includes: retroactively searching, from tmax, a point P04 with an amplitude smaller than 0.4*Vmax, retroactively searching, from tmax, a point P02 with an amplitude smaller than 0.2*Vmax, and determining an end of the time period T4 Where a line connecting P04 and P02 intersects with a 0-axis.

Optionally, S4 includes: obtaining a subsequence of a value sequence corresponding to the drop reference signal DROPref before tmax, determining a minimum value point and a maximum value point of the subsequence, and searching backward, from the minimum value point, a point with a value greater than 33% of a maximum value of the subsequence.

Optionally, S5 includes: searching, among the second median sequence and from tmax, a point with a value smaller than 0, and setting a time point of the point to be t6.

Optionally, S6 includes: determining a point where a line connecting a point corresponding to t6 and a point corresponding to (t6-1) inserts with the 0-axis as an end t6 of the time period T6.

Optionally, S7 includes: S7.1, retroactively searching, from t6, a point P05 with an amplitude greater than 50% of Vmax; S7.2, retroactively searching, from t6, a point P075 with an amplitude greater than 75% of Vmax; S7.3, determining a horizontal line Line1 passing through Pmax (tmax, Vmax); S7.4, determining a straight line Line2 passing through P05 and P075; and S7.5, determining a point where Line1 intersects with Line2, wherein a time point corresponding to the point is an end of the time period T5.

Optionally, S11 includes: S11.1, calculating the time period T4 by subtracting the start of T4 from the end of T4, calculating the time period T5 by subtracting the end of T4 from the end of T5, and calculating the time period T6 by subtracting the end of T5 from the end of T6; S11.2, verifying that T4, T5, T6 are within a threshold range; S11.3, verifying positivity of t7, t8 and t9; and S11.4: saving and outputting calculation results in the form of file.

Advantages

The method for measuring the drop time of the control rod cluster integrated with the rod position measurement device provided in the embodiments of the present disclosure may save signal switching during a test process, enhance automation level of measurement and analysis, and reduce critical path time of nuclear reactor start-up planning occupied by measurement of the drop time.

The analysis result is that there is a drop of a control rod cluster caused by normal power off.

Referring to the figures, through Up induced voltage analysis, the result is normal.

The drop reference signal is normal.

T4=0.062 normal <=0.15,

T5=1.2855 normal <=2.4,

T5±T6=1.778 normal <=3.2;

A first bounce at T7 is normal.

A duration T7 of the bounce is normal.

A second bottoming at T8 is normal.

A second bounce at T9 is normal.

Detailed data are as follows.

t0=20200309 194540.313 dt=0.0005;

T4Bgn-440 (when DROPref falls to 80% of its maximum value);

T4Bgn 446 (start of T4: when DROPref drops to 33% of its maximum value);

T4End 564 (end of T4: a point where a line connecting a point corresponding to 40% of Vmax and a point corresponding to 20% of Vmax intersects with a horizontal axis);

T5End 3135 (end of T5: a point where a line connecting a point corresponding to 75% of Vmax and a point corresponding to 50% of Vmax intersects with a horizontal line passing through Vmax);

T6End 4120 (end of T6: a point of a line connecting a point which has a value smaller than 0 for the first time after Vmax and corresponds to t6 with a preceding point of the point intersects with the horizontal axis;); T7End 4337 (t7: a point greater than 0 for the first time after t6);

T8End 4573 (t8: a point smaller than or equal to 0 for the first time after t7);

T9End 4750 (t9: a point greater than 0 for the first time after t8);

T4+0.062 (T4End-T4Bgn-when DROPref drops to 80% of its maximum value;

T4 0.059 (T4End-T4Bgn when DROPref drops to 33% of its maximum value);

T5 1.2855 (T5End-T4End);

T6 0.4925 (T6End-T5End);

T56 1.778 (T5+T6);

T7 0.1085 (t7-T6End);

T8 0.118 (t8-t7);

T9 0.0885 (t9-t8).

BEST EMBODIMENTS

Detailed Description

Embodiments of the present disclosure provide a method for measuring drop time of a control rod cluster integrated with a rod position measurement device. Specific implement ways of the present disclosure will be described in detail in conjunction with embodiments.

Figure 1:
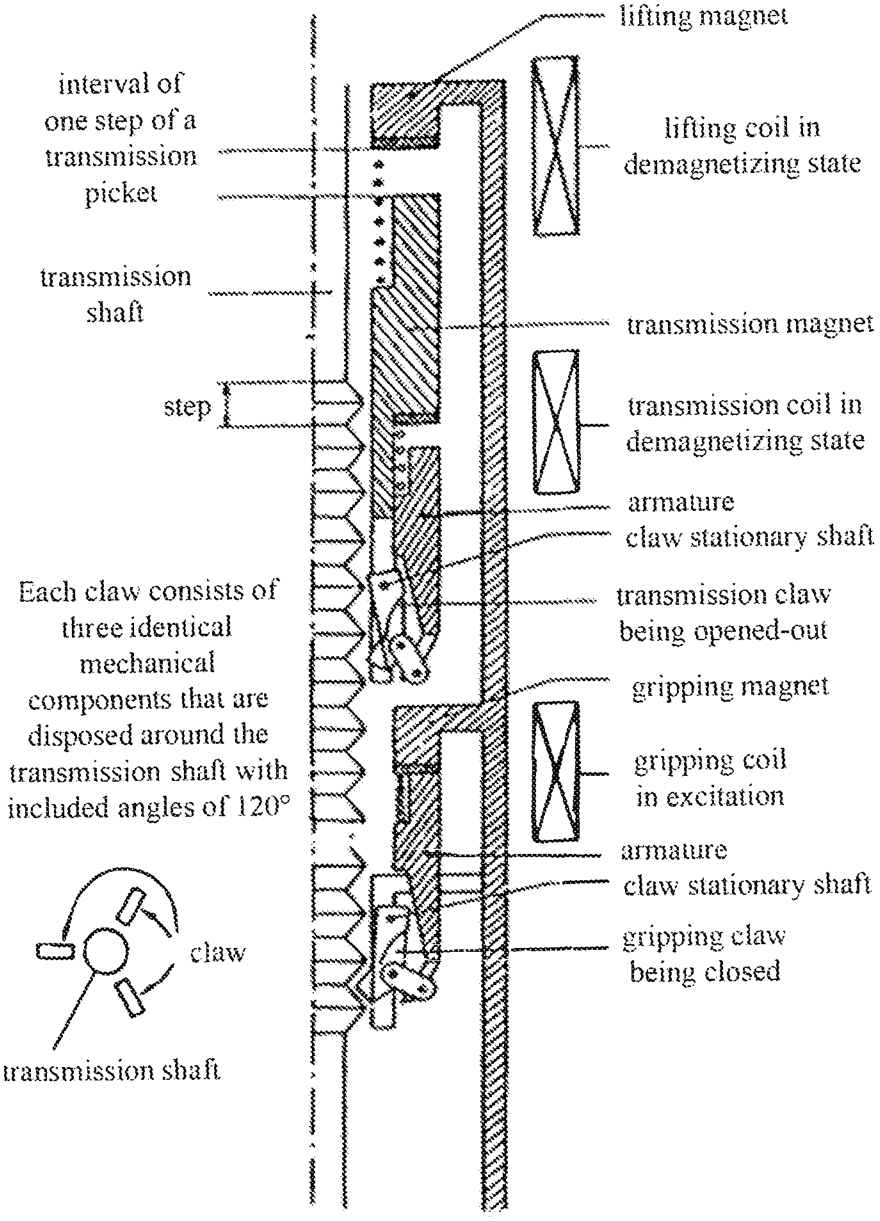
FIG. 1 Prior Art
FIG. 1 is a structural diagram of a CRDM.
Figure 2A:
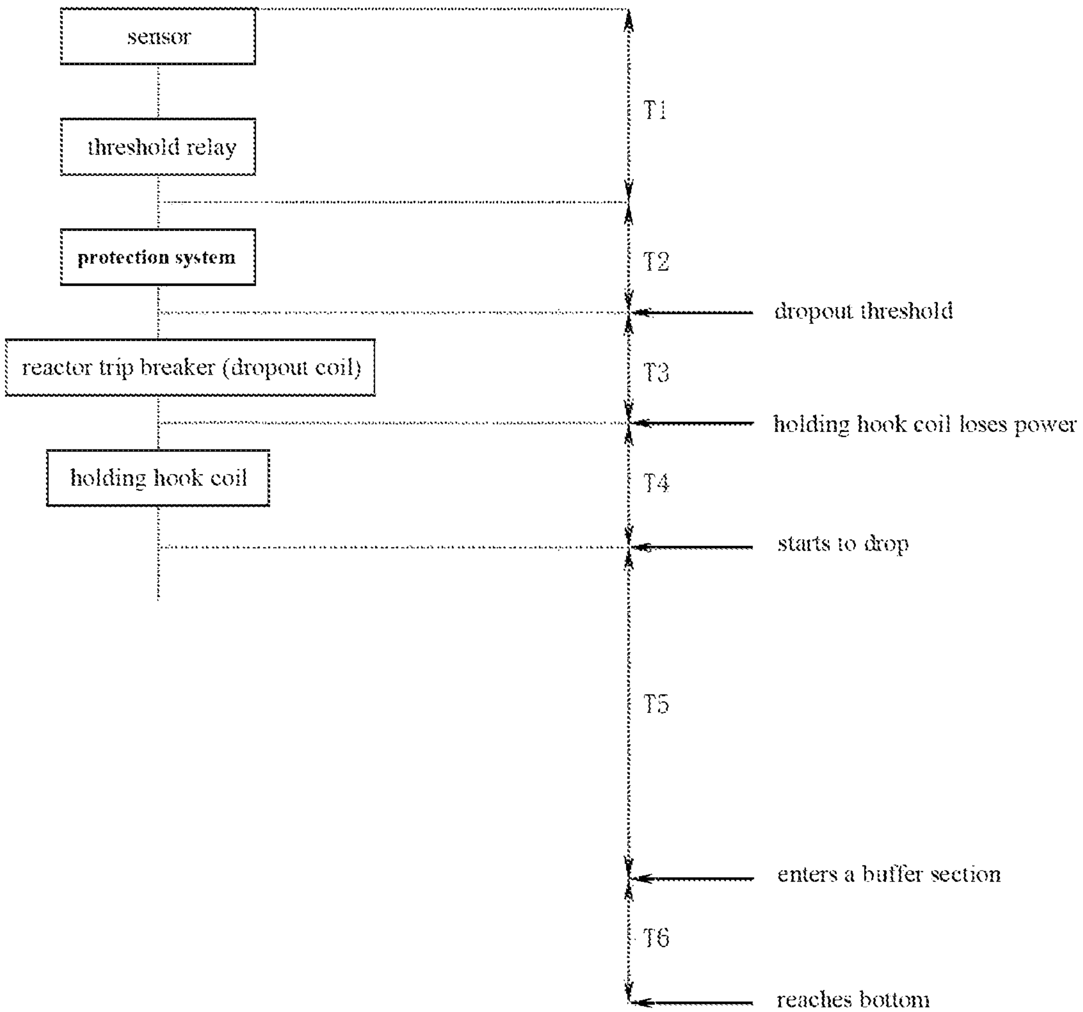
FIG. 2A Prior Art
FIG. 2A is a schematic diagram of drop time of a control rod cluster, where T4 is a time period between a time point when a holding coil current falls to 33% of a rated value and a time point when the control rod cluster starts to drop, and is shorter than 150 ms, T5 is a time period between a time point when the control rod cluster starts to drop and a time point when the control rod cluster enters a buffer section. T6 is a time period between a time point when the control rod cluster enters the buffer section and a time point when the control rod cluster reaches bottom of the buffer section, T4+T5+T6 in a hot state is shorter than 3 s.
Figure 2B:
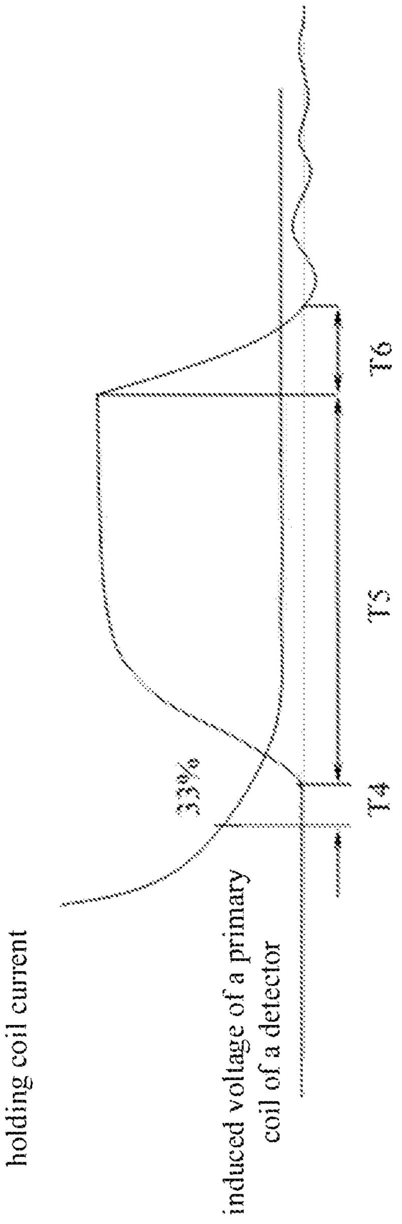
FIG. 2B Prior Art
FIG. 2B is a schematic diagram of characteristic points of a rod drop waveform.
Figure 3:
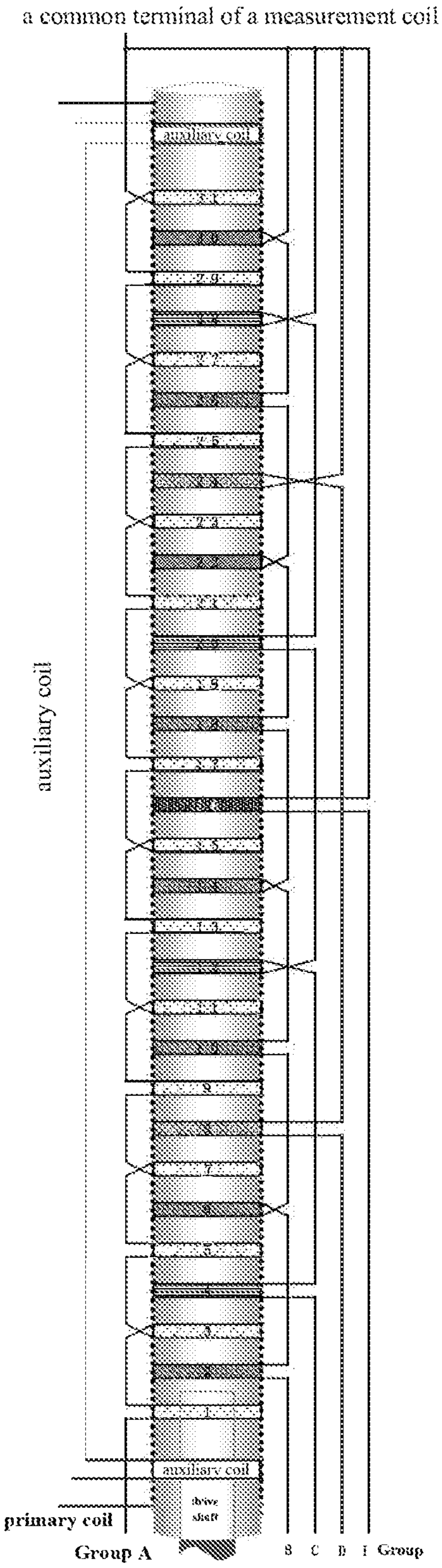
FIG. 3 Prior Art
FIG. 3 illustrates arrangement and connection of coils of a rod position detector.
Figure 4:
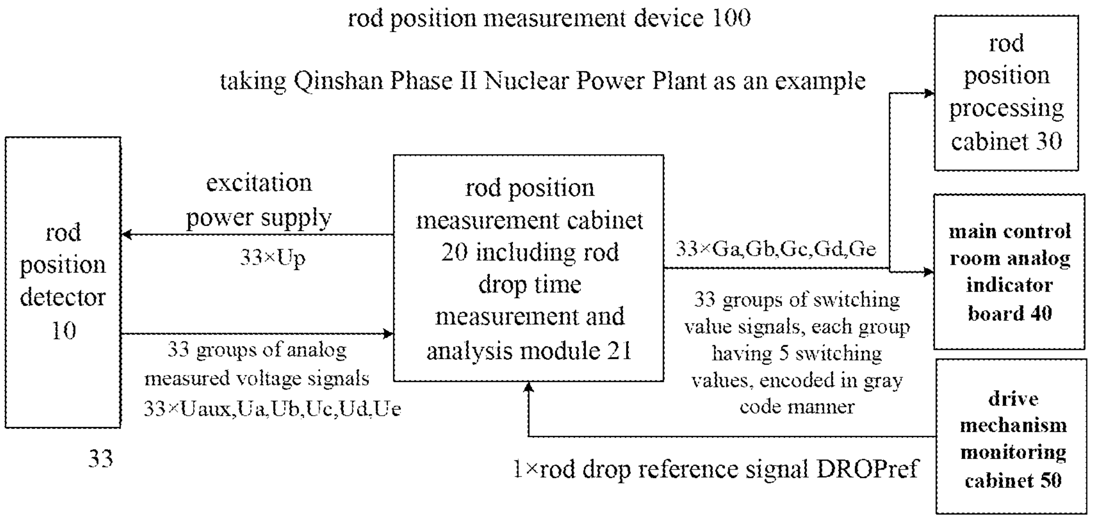
FIG. 4 is a structural diagram of a rod position measurement device according to an embodiment.
Figure 5A:
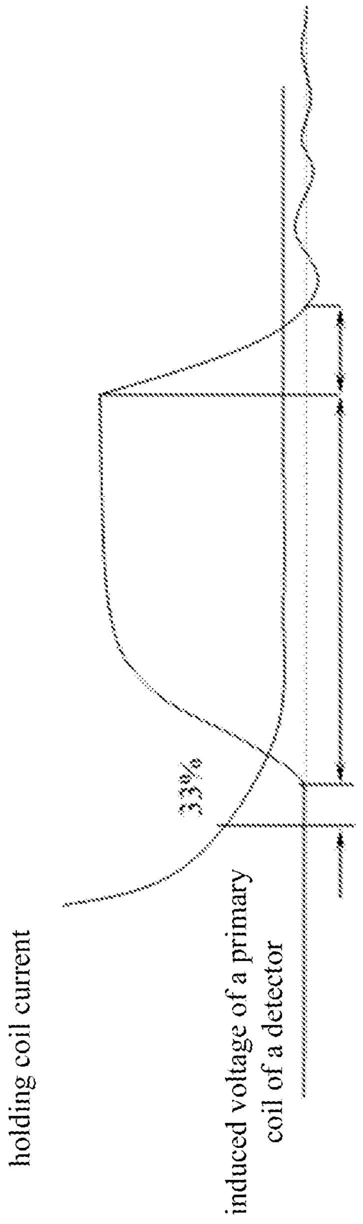
FIG. 5A is a schematic diagram of characteristic points of a rod drop waveform according to an embodiment.
Figure 5B:
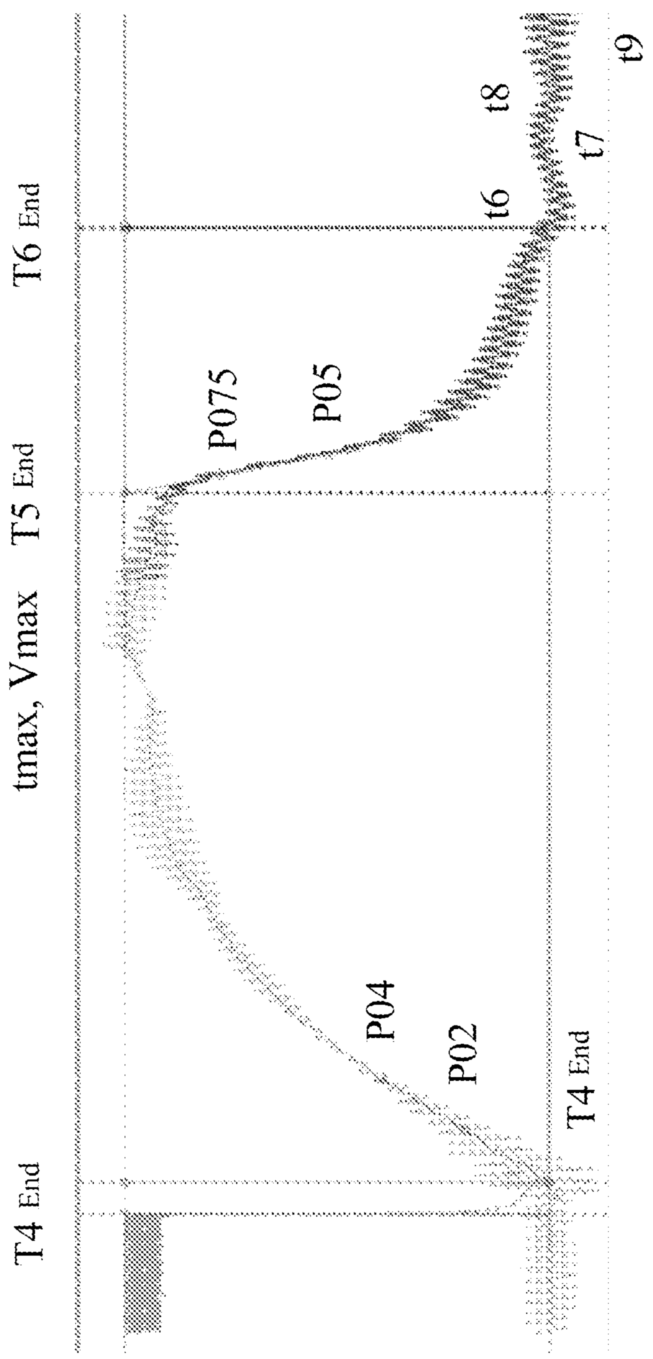
FIG. 5B is a schematic diagram of a calculation and analysis result of a drop time of a control rod cluster according to an embodiment.
Figure 6:
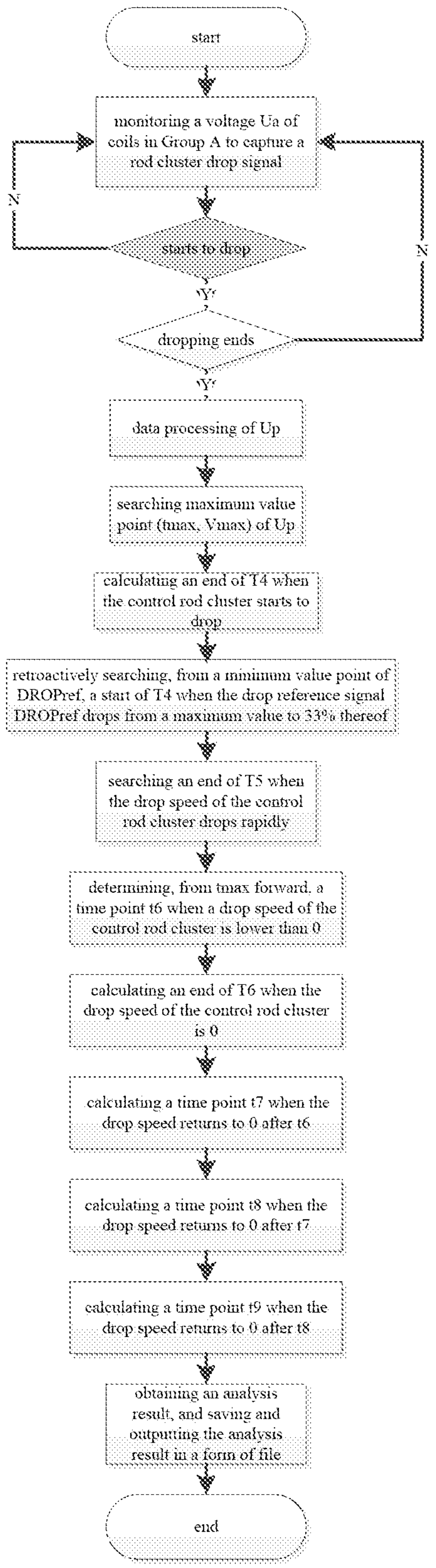
FIG. 6 is a flow chart of measurement and analysis of drop time of a control rod cluster according to an embodiment.
Figure 7A:
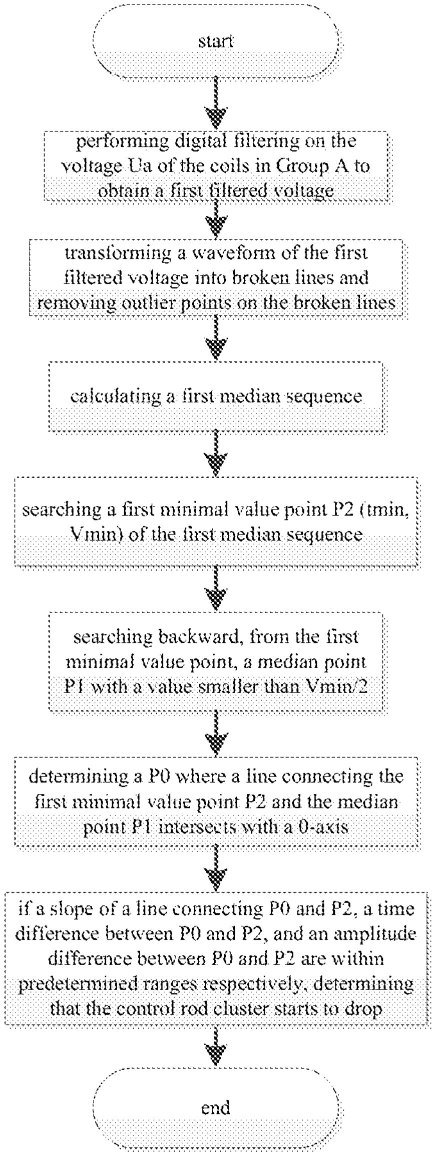
FIG. 7A is a flow chart of capturing a rod cluster drop signal according to an embodiment.
Figure 7B:
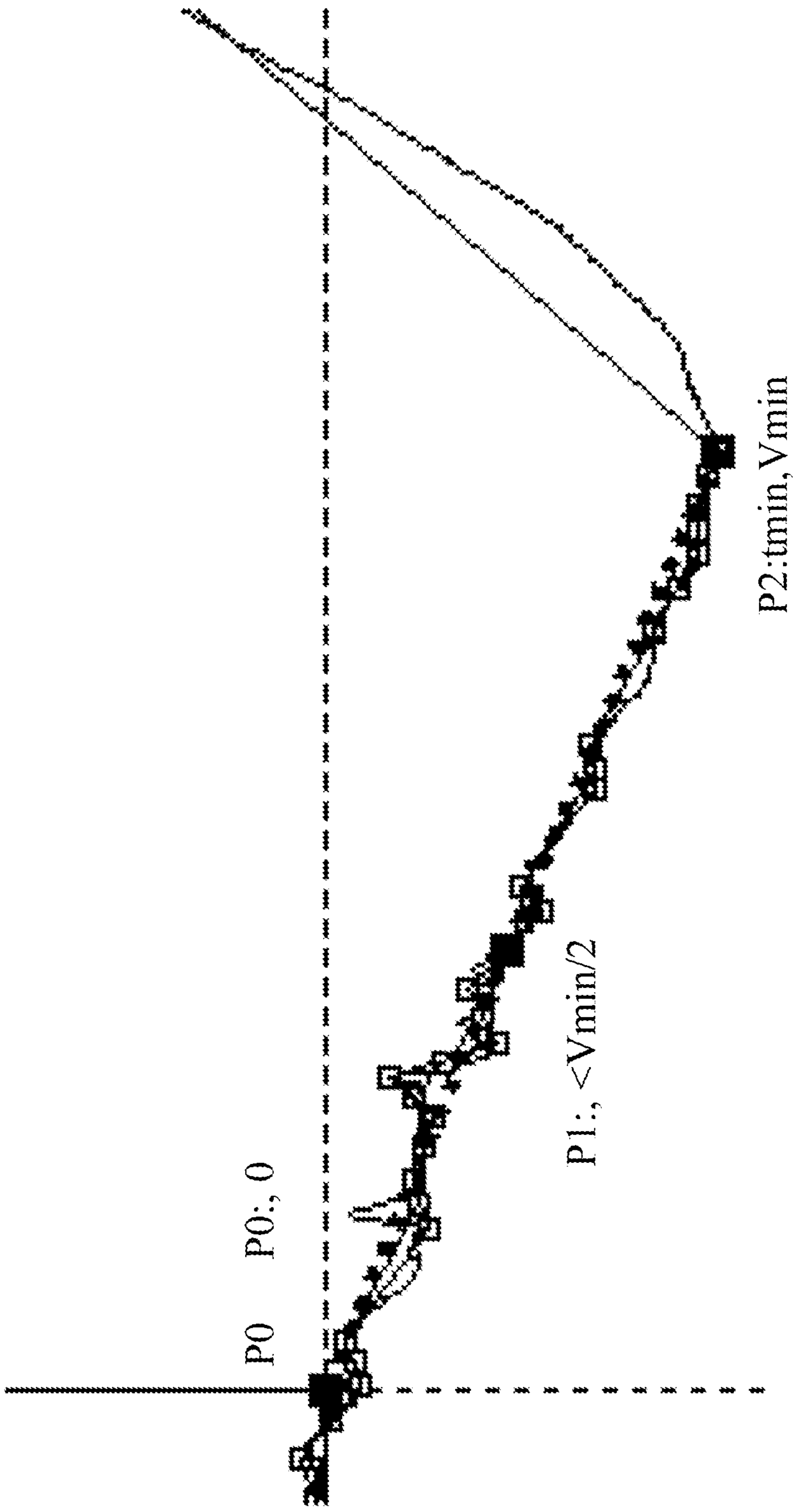
FIG. 7B is a schematic diagram of a rod cluster drop waveform according to an embodiment.
Figure 8:
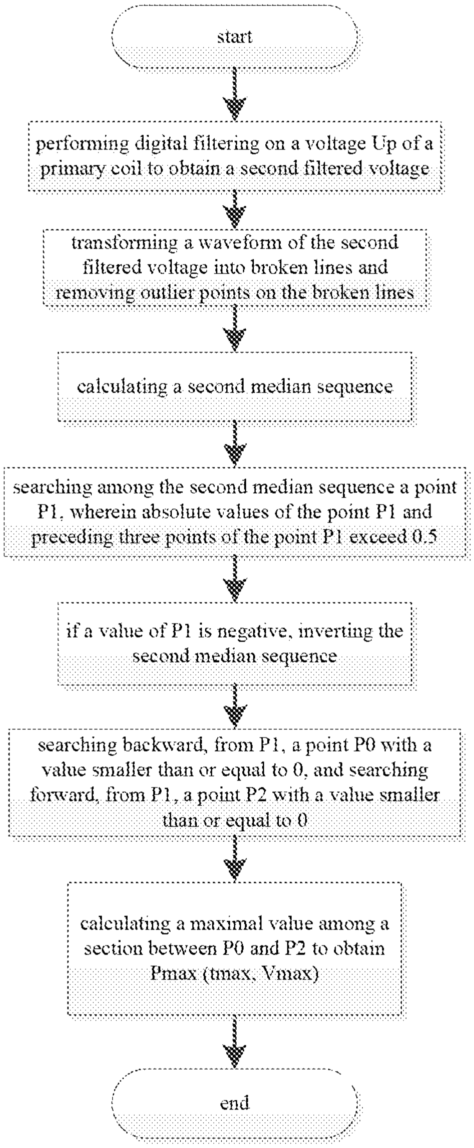
FIG. 8 is a flow chart of searching a maximum drop speed or a local maximum drop speed according to an embodiment.
Figure 9:
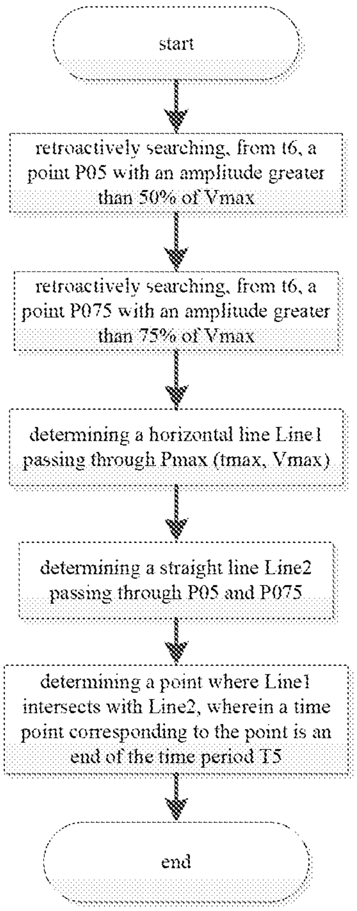
FIG. 9 is a flow chart of searching a time point when a drop speed of a control rod cluster drops rapidly according to an embodiment.
Figure 10:
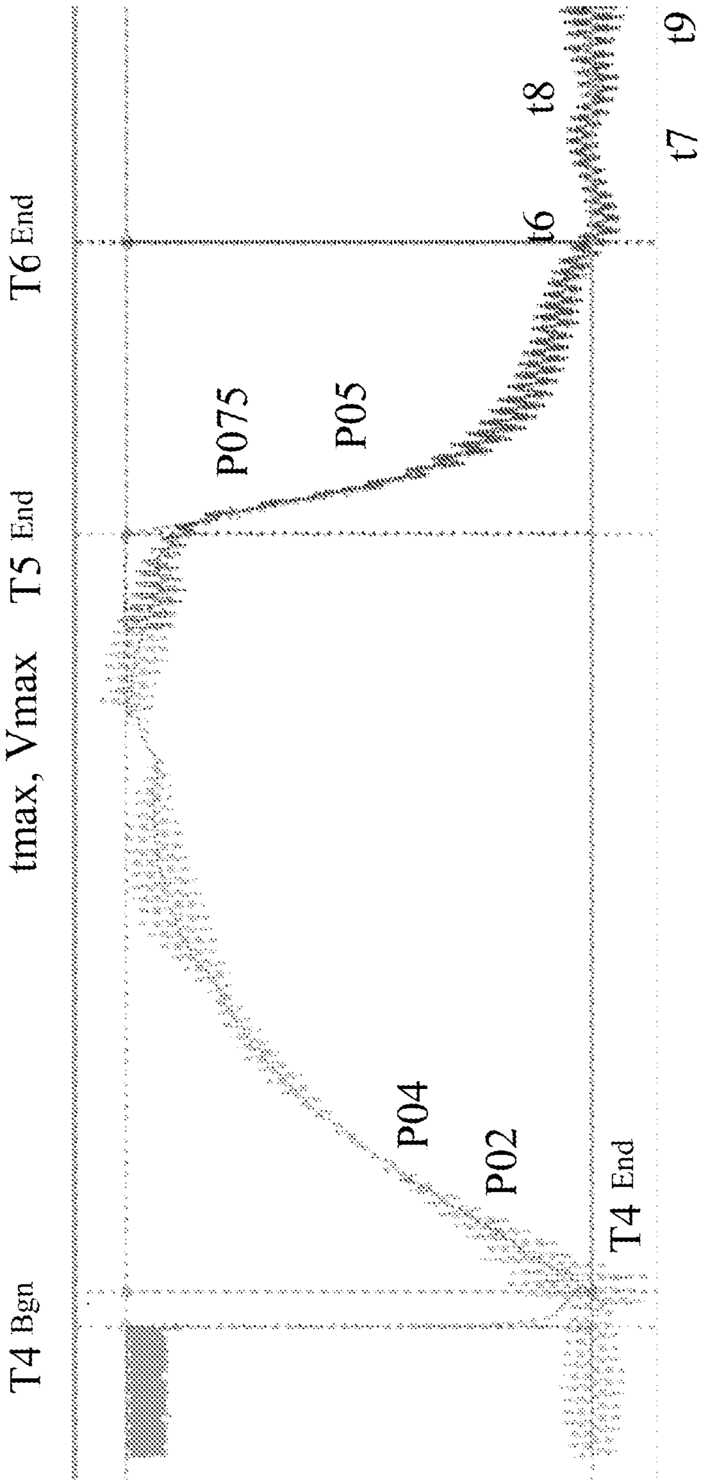
FIG. 10 is a schematic diagram of a calculation and analysis result of chop time of a control rod cluster according to an embodiment.

Referring to FIG. 1 to FIG. 10, FIG. 1 is a structural diagram of a CRDM; FIG. 2A is a schematic diagram of drop time of a control rod cluster; FIG. 2B is a schematic diagram of characteristic points of a rod drop waveform; FIG. 3 illustrates arrangement and connection of coils of a rod position detector; FIG. 4 is a structural diagram of a rod position measurement device according to an embodiment; FIG. 5A is a schematic diagram of characteristic points of a rod drop waveform according to an embodiment; FIG. 5B is a schematic diagram of a calculation and analysis result of a drop time of a control rod cluster according to an embodiment; FIG. 6 is a flow chart of measurement and analysis of drop time of a control rod cluster according to an embodiment; FIG. 7A is a flow chart of capturing a rod cluster drop signal according to an embodiment; FIG. 7B is a schematic diagram of a rod cluster drop waveform according to an embodiment; FIG. 8 is a flow chart of searching a maximum drop speed or a local maximum drop speed according to an embodiment;

FIG. 9 is a flow chart of searching a time point when a drop speed of a control rod cluster chops rapidly according to an embodiment; and FIG. 10 is a schematic diagram of a calculation and analysis result of drop time of a control rod cluster according to an embodiment.

Referring to FIG. 4, in an embodiment, a rod position measurement device 100 includes a rod position measurement cabinet 20 which provides excitation power supply to a rod position detector 10.

Different from an existing method where a voltage signal of a primary coil of a rod position detector is extracted and transmitted to a rod control device room for rod drop time measurement in a time-division switching manner according to different rod clusters during a test, in embodiments of the present disclosure, a rod drop time measurement and analysis module 21 is arranged (integrated) in a rod position measurement cabinet 20 with a rod drop time measurement and analysis function. The rod drop time measurement and analysis module 21 calculates and analyzes based on a primary coil voltage Up fed back by the rod position detector 10, measurement coil voltages Ua, Ub, Uc, Ud and Ue, and a rod drop reference signal DROPref introduced from a drive mechanism monitoring cabinet 50, to obtain a rod cluster drop waveform and a drop time of a control rod cluster.

The rod drop reference signal DROPref is obtained by adding holding coil current signals each of which is selected from each subgroup of control rods.

It should be noted that during measurement of the drop time of the control rod cluster, a reactor operator in a main control room lifts each group of control rods respectively, and after lifting to top of the reactor, the operator disconnects an excitation power supply of a corresponding rod position measurement channel in the rod position measurement cabinet 20, and disconnects a power supply of the corresponding subgroup in a rod control power distribution cabinet. Accordingly, a power supply disconnection signal is transmitted to the rod position measurement cabinet 20 through the rod drop reference signal DROPref. During this process, the rod drop time measurement and analysis module 21 automatically captures the rod drop signal, records and processes it, and analyzes and calculates the drop time of the control rod cluster.

Referring to FIGS. 5A, 5B and 6, a method for measuring drop time of a control rod cluster integrated with a rod position measurement device is provided, wherein the method is used to measure the drop time of each control rod cluster, and includes: S1, monitoring a voltage Ua of coils in Group A to capture a rod cluster drop signal; S2, searching a point (tmax, Vmax) with a maximum drop speed or with a local maximum drop speed; S3, retroactively calculating, from tmax, an end of a time period T4 when the control rod cluster starts to drop; S4, retroactively searching, from a minimum value point of a drop reference signal DROPref, a start of the time period T4 when the drop reference signal DROPref drops from a maximum value to 33% of the maximum value; S5, determining, from tmax forward, a time point t6 when a drop speed of the control rod cluster is lower than 0; S6, calculating an end of a time period T6 when the drop speed of the control rod cluster is 0; S7, searching an end of a time period T5 when the drop speed of the control rod cluster drops rapidly; S8, calculating a time point t7 when the drop speed returns to 0 after t6; S9, calculating a time point t8 when the drop speed returns to 0 after t7; S10, calculating a time point t9 when the drop speed returns to 0 after t8; and S11, obtaining an analysis result, and saving and outputting the analysis result in a form of file.

Optionally, referring to FIGS. 7A and 7B, S1 includes: S1.1, performing digital filtering on the voltage Ua of the coils in Group A to obtain a first filtered voltage; S1.2, transforming a waveform of the first filtered voltage into broken lines and removing outlier points on the broken lines; S1.3, calculating a first median sequence; S1.4, searching a first minimal value point P2 (tmin, Vmin) of the first median sequence; S1.5, searching backward, from the first minimal value point, a median point P1 with a value smaller than Vmin/2; S1.6, determining a point P0 where a line connecting the first minimal value point P2 and the median point P1 intersects with a 0-axis; and S1.7, if a slope of a line connecting P0 and P2, a time difference between P0 and P2, and an amplitude difference between P0 and P2 are within predetermined lined ranges respectively, determining that the control rod cluster starts to drop.

Optionally, referring to FIG. 8, S2 includes: S2.1, performing digital filtering on a voltage Up of a primary coil to obtain a second filtered voltage; S2.2, transforming a waveform of the second filtered voltage into broken lines and removing outlier points on the broken lines; S2.3, calculating a second median sequence; S2.4, searching among the second median sequence a point P1, wherein absolute values of the point P1 and preceding three points of the point P1 exceed 0.5; S2.5, if a value of P1 is negative, inverting the second median sequence; S2.6, searching backward, from P1, a point P0 with a value smaller than or equal to 0, and searching forward, from P1, a point P2 with a value smaller than or equal to 0; and S2.7, calculating a maximal value among a section between P0 and P2 to obtain Pmax (tmax, Vmax).

Optionally, referring to FIGS. 5A and 5B, S3 includes: retroactively searching, from tmax, a point P04 with an amplitude smaller than 0.4*Vmax, retroactively searching, from tmax, a point P02 with an amplitude smaller than 0.2*Vmax, and determining an end of the time period T4 where a line connecting P04 and P02 intersects with a 0-axis.

Optionally, S4 includes: obtaining a subsequence of a value sequence corresponding to the drop reference signal DROPref before tmax, determining a minimum value point and a maximum value point of the subsequence, and searching backward, from the minimum value point, a point with a value greater than 33% of a maximum value of the subsequence.

Optionally, S5 includes: searching, among the second median sequence and from tmax, a point with a value smaller than 0, and setting a time point of the point to be t6.

Optionally, S6 includes: determining a point where a line connecting a point corresponding to t6 and a point corresponding to (t6-1) inserts with the 0-axis as an end t6 of the time period T6.

Optionally, referring to FIGS. 9, 5A and 5B, S7 includes: S7.1, retroactively searching, from t6, a point P05 with an amplitude greater than 50% of Vmax; S7.2, retroactively searching, from t6, a point P075 with an amplitude greater than 75% of Vmax; S7.3, determining a horizontal line Line1 passing through Pmax (tmax, Vmax); S7.4, determining a straight line Line2 passing through P05 and P075; and S7.5, determining a point where Line1 intersects with Line2, wherein a time point corresponding to the point is an end of the time period T5.

Optionally, S11 includes: S11.1, calculating the time period T4 by subtracting the start of T4 from the end of T4, calculating the time period T5 by subtracting the end of T4 from the end of T5, and calculating the time period T6 by subtracting the end of T5 from the end of T6; S11.2, verifying that T4, T5, T6 are within a threshold range; S11.3, verifying positivity of t7, t8 and t9; and S11.4: saving and outputting calculation results in the form of file.

The calculation and analysis result of the drop time can be found in FIG. 10. Technical features such as specific type selection of the control rods in the present disclosure may be referred to exiting solutions. Specific structures, working principles, possible control methods and possible spatial arrangements of these technical features may adopt common selections in the art, which should not be regarded as an invention point of the present disclosure, and is not described in detail here.

It is still possible for those skilled in the art to modify technical solutions described in the foregoing embodiments, or to perform equivalent replacements for some of the technical features. Any modifications, equivalent replacements and improvement made within the spirit and principles of the present disclosure should fall into the scope of the present disclosure.

What is claimed is:

1. A method for measuring drop time of a nuclear reactor control rod cluster integrated with a rod position measurement device, wherein the method is used to measure the drop time of the nuclear reactor control rod cluster, and comprises:

S1, monitoring a voltage Ua of coils in Group A to capture a rod cluster drop signal;

S2, searching a point (tmax, Vmax) with a maximum drop speed;

S3, retroactively calculating, from tmax, an end of a time period T4 when the nuclear reactor control rod cluster starts to drop;

S4, retroactively searching, from a minimum value point of a drop reference signal DROPref, a start of the time T4 period when the drop reference signal DROPref drops from a maximum value to 33% of the maximum value;

S5, determining, from tmax forward, a time point t1 when a drop speed of the nuclear reactor control rod cluster is lower than 0;

S6, calculating an end of a time period T6 when the drop speed of the nuclear reactor control rod cluster is 0;

S7, searching an end of a time period T5 based on a change in the drop speed of the nuclear reactor control rod cluster;

S8, calculating a time point t2 when the drop speed returns to 0 after t1;

S9, calculating a time point t3 when the drop speed returns to 0 after t2;

S10, calculating a time point t4 when the drop speed returns to 0 after t3; and

S11, performing calculation on results obtained in S1 to S10 to obtain calculation results, and saving and outputting the analysis result calculation results in a form of file;

wherein S2 comprises:

S2.1, performing digital filtering on a voltage Up of a primary coil to obtain a second filtered voltage;

S2.2, transforming a waveform of the second filtered voltage into broken lines and removing outlier points on the broken lines;

S2.3, calculating a second median sequence;

S2.4, searching among the second median sequence a point P1, wherein absolute values of the point P1 and preceding three points of the point P1 exceed 0.5;

S2.5, if a value of P1 is negative, inverting the second median sequence;

S2.6, searching backward, from P1, a point P0 with a value smaller than or equal to 0, and searching forward, from P1, a point P2 with a value smaller than or equal to 0; and S2.7, calculating a maximal value among a section between P0 and P2 to obtain Pmax (tmax, Vmax);

wherein S7 comprises:

S7.1, retroactively searching, from t1, a point P05 with an amplitude greater than 50% of Vmax;

S7.2, retroactively searching, from t1, a point P075 with an amplitude greater than 75% of Vmax;

S7.3, determining a horizontal line Line1 passing through Pmax (tmax, Vmax);

S7.4, determining a straight line Line2 passing through P05 and P075; and

S7.5, determining a point where Line1 intersects with Line2, wherein a time point corresponding to the point is an end of the time period T5.

2. The method according to claim 1, wherein S1 comprises:

S1.1, performing digital filtering on the voltage Ua of the coils in Group A to obtain a first filtered voltage;

S1.2, transforming a waveform of the first filtered voltage into broken lines and removing outlier points on the broken lines;

S1.3, calculating a first median sequence of a result of $1.2;

S1.4, searching a first minimal value point P2 (tmin, Vmin) of the first median sequence;

S1.5, searching backward, from the first minimal value point, a median point P1 with a value smaller than Vmin/2;

S1.6, determining a point P0 where a line connecting the first minimal value point P2 and the median point P1 intersects with a 0-axis; and S1.7, if a slope of a line connecting P0 and P2, a time difference between P0 and P2, and an amplitude difference between P0 and P2 are within predetermined ranges respectively, determining that the nuclear reactor control rod cluster starts to drop.

3. The method according to claim 1, wherein S3 comprises:

retroactively searching, from tmax, a point P04 with an amplitude smaller than 0.4*Vmax, retroactively searching, from tmax, a point P02 with an amplitude smaller than 0.2*Vmax, and determining an end of the time period where a line connecting P04 and P02 intersects with a 0-axis.

4. The method according to claim 3, wherein S4 comprises:

obtaining a subsequence of a value sequence corresponding to the drop reference signal DROPref before tmax, determining a minimum value point and a maximum value point of the subsequence, and searching backward, from the minimum value point, a point with a value greater than 33% of a maximum value of the subsequence.

5. The method according to claim 4, wherein S5 comprises:

searching, among the second median sequence and from tmax, a point with a value smaller than 0, and setting a time point corresponding to the point to be t6.

6. The method according to claim 5, wherein S6 comprises:

determining a point where a line connecting a point corresponding to t1 and a point corresponding to (t1-1) inserts with the 0-axis as an end t1 of the time period T6.

7. The method according to claim 1, wherein S11 comprises:

S11.1, calculating the time period T4 by subtracting the start of T4 from the end of T4, calculating the time period T5 by subtracting the end of T4 from the end of T5, and calculating the time period T6 by subtracting the end of T5 from the end of T6;

S11.2, verifying that T4, T5, T6 are within a threshold range;

S11.3, verifying positivity of t2, t3 and t4; and

S11.4: saving and outputting calculation results in the form of file.

8. The method according to claim 2, wherein S3 comprises:

retroactively searching, from tmax, a point P04 with an amplitude smaller than 0.4*Vmax, retroactively searching, from tmax, a point P02 with an amplitude smaller than 0.2*Vmax, and determining an end of the time period T4 where a line connecting P04 and P02 intersects with a 0-axis.

9. The method according to claim 8, wherein S4 comprises:

obtaining a subsequence of a value sequence corresponding to the drop reference signal DROPref before tmax, determining a minimum value point and a maximum value point of the subsequence, and searching backward, from the minimum value point, a point with a value greater than 33% of a maximum value of the subsequence.

10. The method according to claim 9, wherein S5 comprises:

searching, among the second median sequence and from tmax, a point with a value smaller than 0, and setting a time point corresponding to the point to be t1.

11. The method according to claim 10, wherein S6 comprises:

determining a point where a line connecting a point corresponding to t1 and a point corresponding to (t1-1) inserts with the 0-axis as an end t1 of the time period T6.

12. The method according to claim 1, wherein S11 comprises:

S11.1, calculating the time period T4 by subtracting the start of T4 from the end of T4, calculating the time period T5 by subtracting the end of T4 from the end of T5, and calculating the time period T6 by subtracting the end of T5 from the end of T6;

S11.2, verifying that T4, T5, T6 are within a threshold range;

S11.3, verifying positivity of t2, t3 and t4; and

S11.4: saving and outputting the calculation results in the form of file.

* * * * *